United States Patent [19]
Wilner

[11] 4,093,933
[45] June 6, 1978

[54] SCULPTURED PRESSURE DIAPHRAGM

[75] Inventor: Leslie B. Wilner, Palo Alto, Calif.

[73] Assignee: Becton, Dickinson Electronics Company, San Juan Capistrano, Calif.

[21] Appl. No.: 686,419

[22] Filed: May 14, 1976

[51] Int. Cl.² ............................................. H01L 10/10
[52] U.S. Cl. .................................. 338/42; 73/88.5 SD
[58] Field of Search .................................. 338/2, 4, 42; 73/398 AR, 406, 88.5 SD; 357/26; 29/580, 610 R

[56] References Cited

U.S. PATENT DOCUMENTS

| | | | |
|---|---|---|---|
| 3,341,794 | 9/1967 | Stedman | 338/4 |
| 3,520,191 | 7/1970 | Pien | 338/4 X |
| 3,568,124 | 3/1971 | Sonderegger | 338/4 |
| 3,848,329 | 11/1974 | Igarashi et al. | 29/580 |

Primary Examiner—C. L. Albritton
Attorney, Agent, or Firm—Reed C. Lawlor

[57] ABSTRACT

The invention is concerned with a pressure diaphragm that is composed of a nonmetallic material that has been sculptured by etching a plate to form thick motes, or islands, and a thick rim interconnected by thin sheet material. The thick portions are separated by thin flexures in which the deflection of the diaphragm is concentrated, whereby the deflection yields a high value of electric output per unit pressure.

11 Claims, 7 Drawing Figures

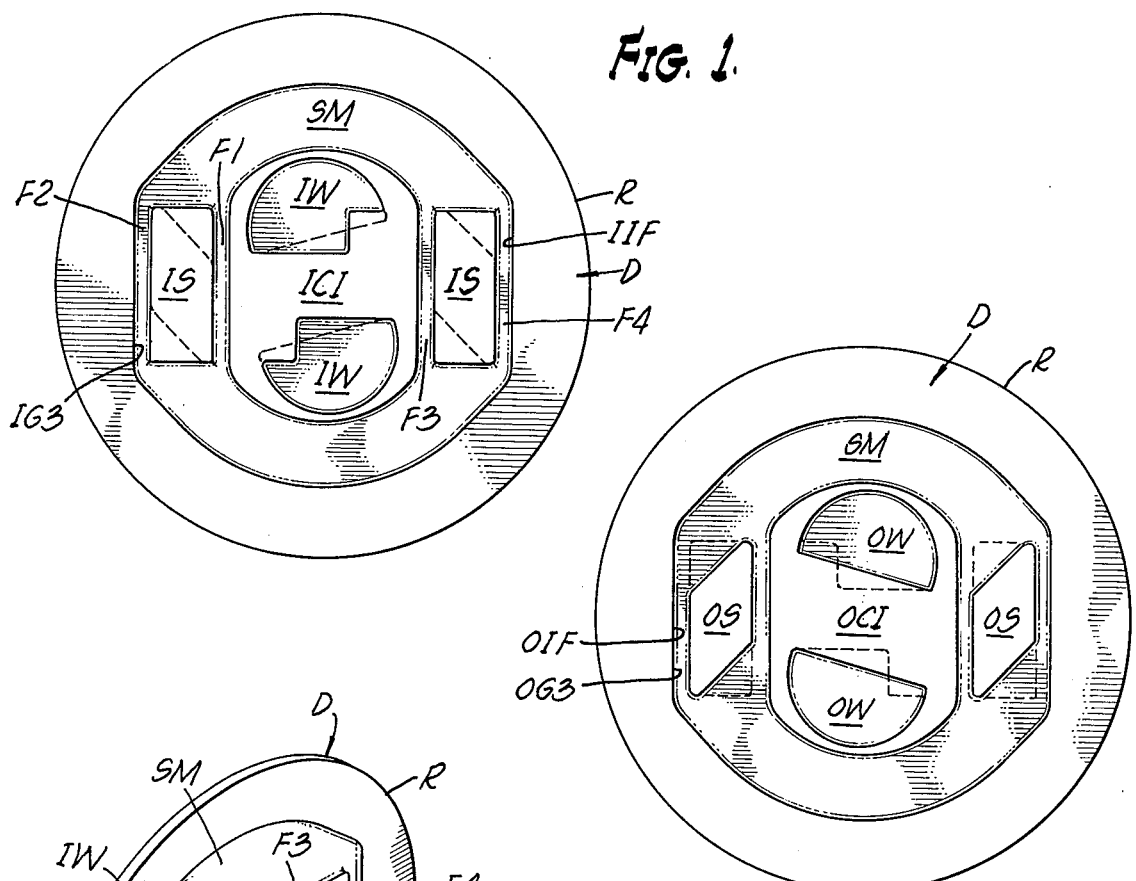
FIG. 1.
FIG. 2.
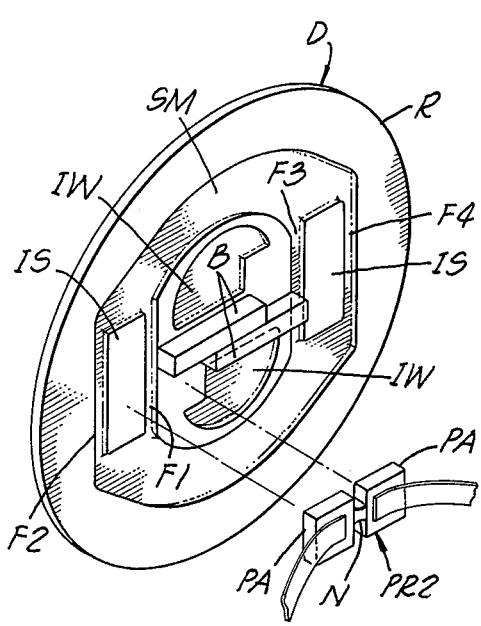
FIG. 3.
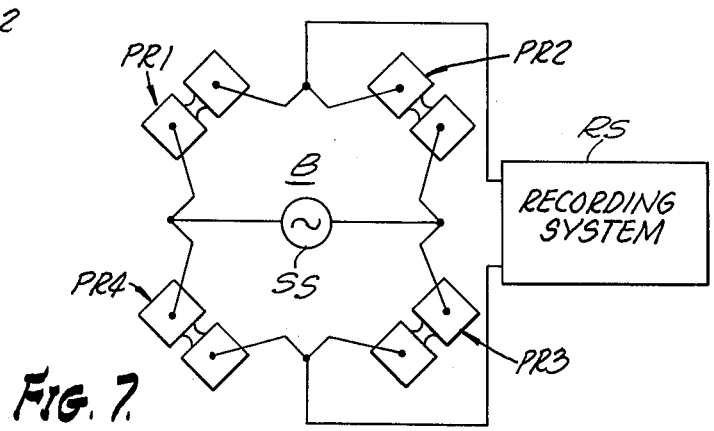
FIG. 7.

SCULPTURED PRESSURE DIAPHRAGM

INTRODUCTION

This invention is concerned with an improved pressure responsive transducer and a diaphragm therefor.

Objects of the invention are to provide a pressure transducer of long life, high sensitivity, and of uniform response over a wide band of frequencies.

GENERAL DESCRIPTION OF INVENTION AND PRIOR ART

The pressure transducer of this invention employs a diaphragm of high Young's modulus but low density with a plurality of thin flexures that form "hinges" between thick rigid portions. In this transducer the deflection of the diaphragm is concentrated in the flexures when the diaphragm is exposed to a pressurized medium. Piezoresistive means that respond to the flexing action in the hinges produce electrical signals corresponding to the pressure. In this invention a crystalline material that is easily etched to form the required grooves is employed for the diaphragm material. By employing readily etchable material selected from the group consisting of silicon or germanium, the diaphragm of required shape is easily manufactured at relatively low cost.

Pressure gauges of the general type to which this invention particularly applies have employed diaphragms composed of steel. Such a pressure transducer is illustrated and described in the Pien U.S. Pat. No. 3,520,191. That pressure transducer employs steel for the diaphragm and wire gauges across the flexures. The use of steel has the disadvantage that if the steel has high corrosion resistance and therefore long life, it is characterized by high hysteresis. Steel of type AISI 316 stainless is such a steel. On the other hand, if a steel having low hysteresis is employed it is characterized by low corrosion resistance. Steel of type AISI 4340 constitutes such a material. Thus when employing steel the diaphragm either has high hysteresis and is therefore erratic in its operation or is of relatively short life because of the low corrosion resistance. These disadvantages are avoided in this invention by employing a semiconductive material such as silicon or germanium for the diaphragm.

At the same time, because the semiconductive material has a lower density than steel by a factor of about 3 but an elastic modulus similar to that of steel, assuming all shape characteristics are the same, the diaphragm of the pressure transducer of the present invention is characterized by a resonant frequency that is about 75% higher. As a result, uniform response is obtained with a pressure transducer of this invention over a wider range of frequencies than if steel is employed.

In the embodiment of the invention described herein, piezoresistive sensors of a well known type such as those described in U.S. Pat. No. 3,351,880 and U.S. Pat. No. 3,501,732 are bridged across the grooves to respond to the flexing action produced when the diaphragm is subjected to changes in pressure on one side thereof. Such piezoresistive sensors have high gauge factors thus producing large changes of electrical output signals for a given change of pressure.

The foregoing and other advantages and features of the invention will become apparent from a description of a single embodiment thereof which is illustrated in the accompanying drawings and described hereinbelow.

THE DRAWINGS

FIG. 1 is an inside plan view of a diaphragm employed in this invention;

FIG. 2 is an outside plan view of a diaphragm employed in this invention;

FIG. 3 is a perspective exploded view of the inside of the diaphragm showing reinforcing bars and a piezoresistive element that is employed as one of the sensors;

FIG. 7 is a diagram of a Wheatstone bridge circuit employed for detecting and measuring changes of pressure.

DESCRIPTION OF THE INVENTION

Figure 4:
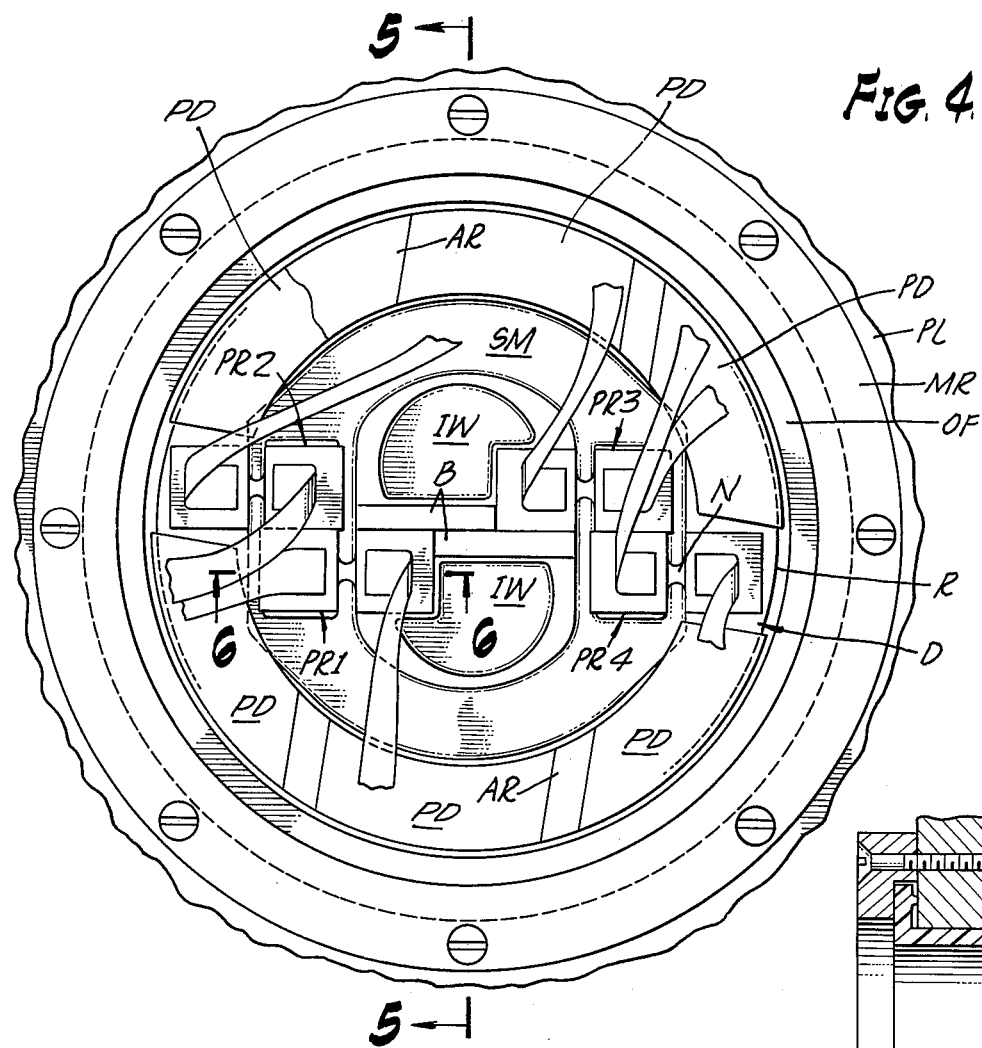
FIG. 4 is an inside view of the transducer.

Referring to the drawings and particularly FIGS. 1–6, inclusive, there is shown a pressure transducer PD of this invention which employs a diaphragm D that has been shaped by etching to comprise a rim R, inner and outer central islands, or motes, ICI and OCI, and inner and outer sideboard islands, or motes, IS and OS.

It will be noted that the terms inner and outer are used in two different senses in this specification. It is believed that the senses in which these words are used, however, are clear in each case, from the context. More particularly, the surfaces of the diaphragm are referred to as inner and outer according to their locations relative to the orifice OR in the plate PL of the container in which the pressure transducer PD is mounted. Thus parts of the diaphragm surfaces are referred to as inner and outer parts. On the other hand, the term inner sometimes refers to a part that is located radially inwardly on either surface compared with some other part on that surface.

The islands are formed integral with a thin sheet member SM that extends throughout the circular space within the rim R. The two outboard islands IS are located on a diameter on opposite sides of the inner central island ICI. The inner outboard islands are of rectangular configuration (as shown in FIG. 1) and are separated from the inner central island ICI and from the inner straight edges IIE of the rim R by straight channels or grooves of uniform width.

The two outer sideboard islands OS are located on a diameter on opposite sides of the outer central island OCI. The outer sideboard islands OS are of acute parallelogram configuration (as shown in FIG. 2) and are separated by straight channels or grooves of uniform width from the outer central island OCI and from the inner straight edges OIE of the rim R.

The outer peripheries of the two central islands ICI and OCI are congruent and opposite so that the two inner islands together form a rigid central portion of the diaphragm. However, inner wells IW and outer wells OW are formed centrally of them at the top and bottom portions thereof to reduce their mass, while still providing rigidity by virtue of the thickness and extent of the peripheries of the islands. The central portions of these islands are of substantial width and are shaped to facilitate support of sensor elements as described hereinafter. Two bars B extend transversely across the central portions of the inner island ICI to add to the rigidity of the central islands.

The narrow portions of the sheet member SM that lie between the sideboard islands and the other protruding members, namely the central islands and the rim of the diaphragm, form flexures, or leaf springs, or Cardan-like hinges. Consequently, when fluid under pressure exerts a force on one side of the diaphragm that is greater than the force applied by fluid on the other side, the diaphragm is deflected in a direction parallel to the axis that is concentric with the rim. Since the islands are very rigid compared with the thin sheet members, the bending is concentrated in the flexures. Bending action is detected by means of four piezoresistive elements PR1, PR2, PR3, and PR4, that bridge the gaps across gaps between the island opposite the corresponding flexures F1, F2, F3, and F4, respectively.

The inner (radially inward) flexures are designated by the symbols F1 and F3 and the two outer (radially outward) flexures are designated by the symbols F2 and F4.

Grooves are formed on the opposite sides of the diaphragm to form flexures. Thus inner grooves IG1, IG2, IG3, and IG4 are formed adjacent the inner sides of the flexures F1, F2, F3, and F4. Outer grooves OG1, OG2, OG3, and OG4 are formed on the outer sides of the respective flexures. The flexures, in each case, are formed by an etching process which forms the gooves.

It is to be noted that the two inner flexures F1 and F3 bend in a direction opposite from that in which the outer flexures F2 and F4 bend, when the diaphragm is deflected by differential pressure applied across the opposite faces of the diaphragm. Thus, if in FIG. 4 the inner islands ICI and OCI are deflected away from the viewer from the plane of the paper, that is outwardly toward the orifice OR in FIG. 5, the inner flexures F1 and F3 bend in a concave direction while the outer flexures F2 and F4 bend in a convex direction.

The bending of the four flexures F1, F2, F3, and F4 is detected by means of four piezoresistive sensors PR1, PR2, PR3, and PR4, respectively. Each of these sensors may be of the type described in U.S. Pat. No. 3,351,880. Each comprises a pair of pads PA on opposite sides of a reduced neck N. The pads of each sensor are bonded to enlarged portions of the diaphragm on opposite sides of a groove. Such an arrangement is shown for the piezoresistive element PR2 and the flexure F1 in FIG. 6. The four piezoresistive elements are thus mounted in a geometrical array as shown in FIG. 4 with the sensors remote from the flexures. The entire arrangement is diametrically symmetrical about the center of the diaphragm.

Mounting of the piezoresistive sensors in this manner results in high concentration of stress in the necks of the piezoresistive sensor.

Electrical connectors are chemically bonded to the pads so that the piezoresistors PR1, PR2, PR3, and PR4 may be connected in a Wheatstone bridge type circuit such as that illustrated in FIG. 7. Such an arrangement of connections in a Wheatstone bridge has been illustrated and described heretofore in U.S. Pat. No. 3,351,880.

The diaphragm with the four piezoresistive elements cemented in place is cemented to the inwardly extending flange IFL of a mounting member MM which in turn is secured in place by means of a mounting ring MR to support the diaphragm opposite the orifice OR in a wall of a pressurized vessel or other container. A sealing bead BD formed on the outwardly extending flange OFL of the mounting member, seals the pressure transducer in place to prevent leakage of fluid through the orifice when the pressure on one side of the diaphragm changes from that on the other side.

Two almost semicircular spacer arcs AR composed of porcelain ceramic are bonded to the inner face of the rim R to lend additional stiffness to the rim and to provide insulated metal contact pads PD which may be used to interconnect the leads from the piezoresistive sensors to the wires, and possibly to mount other small components (not shown). Sensor wires are typically aluminum, and wires that connect the transducer to external circuitry are copper.

Silver is deposited at three points of each arc forming three isolated pads PD on each arc AR. The leads from the piezoresistor units are sonically bonded to these pads and the copper wires are soldered to these pads to provide connections to other circuitry. Of course other suitable combinations of metals may also be used.

Thus, assuming that the four piezoresistive elements PR1, PR2, PR3, and PR4 all have the same characteristics, when the values of the resistances of the two inner piezoresistive elements PR1 and PR3 change in one direction, the values of the resistances of the two outer piezoresistive elements PR2 and PR4 change in the opposite direction. Thus, when the resistances of the inner piezoresistive elements increase, the resistances of the two outer piezoresistive elements decrease, and vice versa. Advantage of these relations may be taken by connecting the piezoresistive elements PR1, PR2, PR3, and PR4 in a bridge circuit in a well known manner such as that illustrated in FIG. 7, employing a signal source SS across one diagonal and a recording system in the opposite diagonal.

With this arrangement, when the pressure of fluid on one side of the diaphragm changes relative to the pressure on the other side, the diaphragm is deflected, causing the two inner flexures to bend in one direction and the two outer flexures to bend in the opposite direction thereby altering the balance of the Wheatstone bridge circuit B and supplying an electrical signal to the recorder that corresponds to the difference in pressure across the sides of the diaphragm. By applying this signal to a motor-driven recording system while the pressure relation is changing, an oscillograph trace may be produced which indicates how the differential pressure varies as a function of time.

In the best embodiment of the invention the diaphragm and the piezoresistive sensors are made of silicon crystals with the crystal axes parallel to each other. In this way, they form, in effect, a unitary structure free of differential thermal expansion between the parts.

In one particular case illustrated in the drawings, the silicon diaphragm had the following characteristics:
  Thickness of rim and rigid portions — 0.010 inch
  Width of slots — 0.010 inch
  Outside diameter of diaphragm — 0.340 inch
  Thickness of flexures — 0.0036 inch
  Resonant frequency — 45 kHz (calculated)
  Depth of grooves — 0.0032 inch When the piezoresistive sensors are composed primarily of silicon, the diaphragm is also composed of silicon. Likewise, if the piezoresistive element is composed primarily of germanium, the diaphragm is also composed of germanium. In both instances an excellent thermal match is obtained between the diaphragm and the piezoresistive sensors. In addition, these two materials have the advantage that even though they are nonmetallic they are good thermal conductors and thus conduct away heat that otherwise may accumulate in the piezoresistive elements because of the passage of electrical current through the piezoresistive sensors.

In etching the diaphragms a polishing etchant is employed such as a standard mixture of hydrofluoric acid and nitric acid mixed in the proportions of 1 to 10. For this purpose, strong concentrates of the respective acids are employed.

Figure 6:
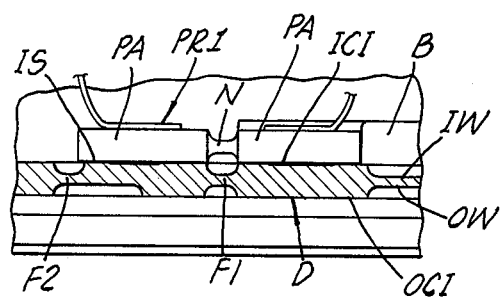
FIG. 6 is a detailed cross-sectional drawing taken on the section 6—6 of FIG. 4 showing the mounting of one of the sensors bridged across a groove.
Figure 5:
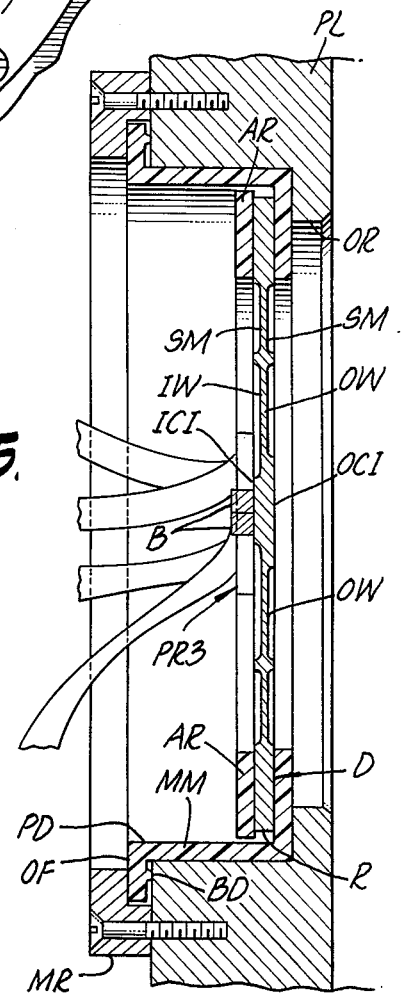
FIG. 5 is a cross-sectional view of the transducer taken on the plane 5—5 of FIG. 4.

In one particular embodiment of the invention, the etching was performed with the aid of such polishing etchant producing sidewalls for the flexure grooves that were rounded as indicated, for example, in FIG. 6. Such etching is known as an isotropic etching. Employing an etching process, deep — so to speak — channels are thus cut in the faces to form their flexures in which the deflection of the diaphragm may be concentrated.

As mentioned above, the diaphragm and the piezoresistive sensors may both be composed primarily of a crystal material selected from the group consisting of silicon and germanium. Silicon is the better of the two because it is more readily etched and because it has a lower density. On the other hand, germanium may be employed where low density and high resonant frequency are not required. Where low density is desired in order to attain a high resonant frequency, silicon carbide may also be employed. The respective densities of the three materials, silicon, silicon carbide, and germanium, are 2.42, 3.20, and 5.36, and they all have relatively high Young's moduli. It is to be noted that both silicon and silicon carbide have densities less than about 4 which, in turn, is considerably less than the density of steel, which is about 7.8.

It will be apparent from the foregoing that a sculptured pressure diaphragm has been provided which may be employed as a component of a pressure transducer having long life, high sensitivity, and a uniform response over a wide range of frequencies. The invention may be employed in many forms different from that described. More particularly, it is contemplated that the diaphragm may be composed of other materials and may be sculptured in other ways and may have other dimensions and that the bending of the flexures may be detected in other ways, all within the scope of the appended claims.

I claim:
1. In a pressure transducer,
   a diaphragm composed of a nonmetallic material, said diaphragm having at least two elongated slots separating thick rigid portions therein and forming at least two respective thin flexures joining said thick rigid portions whereby deflection of said diaphragm causes said flexures to bend about axes parallel to their lengths, and
   strain sensitive means comprising piezoresistive semiconductive means secured to said diaphragm opposite one of said slots to detect relative movement of parts of the corresponding thin flexure in response to bending thereof to change resistance of said semiconductive means by an amount corresponding to a pressure change.
2. In a pressure transducer as defined in claim 1 wherein said nonmetallic material consists of silicon crystal.
3. In a pressure transducer as defined in claim 2 wherein the slots are formed by etching.
4. In a pressure transducer,
   a diaphragm composed of a nonmetallic material, said diaphragm havng at least two elongated slots separating thick rigid portions therein and forming at least two respective thin flexures joining said thick rigid portions whereby deflection of said diaphragm causes said flexures to bend about axes parallel to their lengths, and
   piezoresistive semiconductive means differentially responsive to bending of said flexures to change resistance by an amount corresponding to a pressure change, said piezoresistive means being sensors that are composed of the same base material as the diaphragm and each of which has two ends that are bonded to thick portions of the diaphragm on opposite sides of one of said slots.
5. In a pressure transducer,
   a diaphragm composed of a nonmetallic material, said diaphragm having a thin sheet portion supporting at least two raised portions forming thick rigid islands spaced inwardly from a raised rim portion and providing two thin flexure sections between adjacent raised portions, the spaces opposite said flexure sections between adjacent raised portions being in the form of straight elongated slots whereby deflection of said diaphragm causes said flexures to bend about axes parallel to their lengths, and
   strain sensitive means comprising piezoresistive semiconductive means secured to said diaphragm opposite one of said slots to detect relative movement of parts of the corresponding thin flexure in response to bending thereof to change resistance of said semiconductive means by an amount corresponding to a pressure change.
6. In a pressure transducer as defined in claim 5 wherein said nonmetallic material is a crystal material selected from the group consisting of silicon and germanium.
7. In a pressure transducer as defined in claim 6 wherein said diaphragm is of unitary construction formed by etching a blank to form said islands and said flexures.
8. A pressure transducer as defined in claim 1, wherein said flexures have a thickness small compared with the thickness of said rigid portions.
9. In a pressure transducer as defined in claim 8,
   a second strain sensitive means comprising piezoresistive semiconductive means secured to said diaphragm opposite another of said slots to detect relative movement of parts of the corresponding thin flexure in response to bending thereof to change the resistance of said semiconductive means by an amount corresponding to a pressure change.
10. In a pressure transducer as defined in claim 8 wheren said nonmetallic material has a density less than about 4.
11. In a pressure transducer as defined in claim 10 wherein said nonmetallic material has substantially the same temperature coefficient of expansion as the material of the piezoresistive means.

* * * * *